Patented Dec. 3, 1935

2,022,887

UNITED STATES PATENT OFFICE 2,022,887

COLORED RUBBER AND METHOD OF PRODUCING THE SAME

Harry G. Kiernan, Buffalo, N. Y., assignor to National Aniline & Chemical Company, Inc., New York, N. Y., a corporation of New York No Drawing. Application December 23, 1931, Serial No. 582,876

14 Claims. (Cl. 18—50)

My invention relates to colored rubber products and compositions and to methods of producing and using the same and particularly to methods of incorporating organic dye stuffs such as the vat dyes in rubber to produce rubber products having the desired color.

It has been proposed heretofore to use vat dyes in coloring rubber products and compositions by converting the dye to the corresponding leuco compound and incorporating the leuco compound with latex to produce a rubber composition adapted for certain uses itself and suitable for incorporation in a rubber mix. The leuco compound thus incorporated in rubber compositions may be partially or wholly oxidized to reproduce the dye itself either before or after vulcanization of the rubber.

In converting the vat dyes to the leuco condition it has been the practice heretofore to reduce the dye by the action of inorganic sulfur compounds, such as sodium hydrosulfite or sodium sulfide. The solution of the leuco compound thus produced is readily incorporated in rubber latex or in unvulcanized rubber and rubber mixes. However, on standing the sulfur and sulfur compounds which are present in the product even after the leuco compound has been oxidized to the dye, tend to cause vulcanization of a spontaneous character to take place. For this reason compositions, produced as described above, have in some instances deteriorated on standing due to the vulcanization of the rubber of the composition by the action of the inorganic sulfur compounds present therein.

Among the objects of my invention are to provide a simple and effective method of coloring rubber, to obviate the spontaneous vulcanization of unvulcanized rubber compositions containing vat dyes or the leuco derivatives thereof, to produce compositions adapted for use in the coloring of rubber products and to produce stable compositions which are capable of standing for long periods of time without deteriorating.

These and other objects and features of my invention will appear from the following description thereof in which typical examples of methods of procedure and products produced thereby are set forth.

I have discovered that this tendency can be overcome and satisfactory products which do not undergo spontaneous vulcanization on standing, can be produced by treating vat dyes with a reducing agent free from sulfur and sulfur compounds or other vulcanizing agents. The dyes thus converted to the corresponding leuco compounds can be readily incorporated in latex, unvulcanized rubber and rubber mixes, and thereafter oxidized before or after vulcanizing the rubber. Compositions produced in accordance with my invention may be used in coloring rubber mixes or may be themselves vulcanized if desired.

My invention is adapted for treating a wide range of materials such as rubber latex, rubber emulsions, rubber dispersions, synthetic aqueous rubber emulsions and dispersions, rubber solutions and the like. The dyes adapted for use in practicing my invention are those which on treatment with reducing agents free from sulfur and sulfur compounds or other vulcanizing agents and particularly organic reducing agents, such as reducing sugars and carbohydrates in the presence of an alkaline agent, are converted to the corresponding leuco compounds. Among the dyes particularly suitable for use as hereinafter described are indigo and the vat dyes of the indigo and thioindigo series and the vat dyes of the anthraquinone series.

My invention will be described in detail hereafter with particular reference to the treatment of rubber latex using specific vat dyes, but it will be understood that my invention is applicable to the treatment of other dispersions, emulsions or solutions containing rubber of natural or synthetic origin and therefore the examples of the invention hereinafter recited are intended to be illustrative of my invention and not to limit the same.

The terms "composition" and "rubber composition", as used throughout the specification and in the claims, refer to the product obtained by coagulating latex and similar materials in the presence of the dye or the leuco compound thereof, and the term "latex" is intended to be given broad interpretation to include not only the natural product obtained from plants of the Hevea family, but also artificial latex and other suspensions, emulsions, dispersions and solutions of natural or artificial rubber and the like.

In my preferred practice I mix a dye, such as a member of the indigo series of vat dyes, with an alkaline solution of an organic reducing agent, for instance a reducing sugar. This mixture is heated, whereupon the dye is reduced to the corresponding leuco compound. The resulting solution which contains no sulfur or sulfur compounds is cooled and intimately mixed with latex in suitable proportions to give the desired content of the leuco compound of the dye to the product. Thereafter the mixture is treated with a sufficient amount of an oxidizing agent, such as hydrogen peroxide, to oxidize all or a part of the leuco compound to reproduce the dye. The latex is then coagulated with a suitable acid (formic acid, acetic acid, hydrochloric acid, etc.) causing the dye and any leuco compound remaining in unoxidized form to be taken up and incorporated in the coagulated rubber. The coagulated rubber containing the partially or wholly regenerated dye is separated from the remaining solution and washed with water on a roller mill, during which operation the remaining leuco compound is oxidized to the dye by exposure to the air. The resulting composition in which the dye is intimately incorporated in coagulated rubber, is free from vulcanizing agents, such as sulfur and sulfur compounds, and is adapted for use in producing colored rubber products. The composition, which may contain a relatively large amount of dye and therefore is in the nature of a concentrated dye composition, is added in small amounts to rubber mixes containing suitable fillers, accelerators, sulfur, etc. and is intimately mixed therewith on a mixing roll. The colored rubber mix thus obtained is then molded, vulcanized and otherwise treated in the usual manner for producing rubber products. In some instances I vulcanize the composition itself without incorporating the same in a rubber mix and thus produce rubber products having certain desirable properties.

*Example 1.*—200 parts by weight of 20 per cent paste of Brilliant Indigo 4B (Color Index No. 1184) is mixed with 100 parts by weight of corn sugar and 63 parts of 30° Bé. caustic soda solution. The mixture is heated to 180° F. until it turns brown, indicating that the dye has been reduced to the corresponding leuco compound. The mixture is cooled to 100° F. and 100 parts of 38 per cent latex are added and the whole mixture well stirred until an intimate homogeneous mixture is obtained. Hydrogen peroxide, preferably in the form of a 3 per cent solution, is then added to the well-stirred mixture until it changes from brown to green. The mixture is then treated with formic acid to completely coagulate the latex and cause the dye to agglomerate therewith. The coagulated rubber carrying the dye is separated from the remaining solution and washed with water on a roller mill. The resulting composition is exposed to the air during the washing on the roller mill completing the oxidation of any leuco compound to reproduce the dye. The composition thus obtained is a dark navy blue and may be vulcanized itself or incorporated in a rubber mix to color a large body of rubber. Due to the absence of sulfur and other vulcanizing agents in the composition produced, it may be stored or allowed to stand for long periods of time without undergoing vulcanization.

*Example 2.*—7 parts by weight of the composition produced as described in Example 1 are incorporated on a mixing roll with 392 parts by weight of a rubber mix consisting of:

| | Parts by weight |
|---|---|
| Pale crepe rubber | 140 |
| Whiting | 140 |
| Lithophone | 30 |
| Zinc oxide | 20 |
| Stearic acid | 4 |
| Powdered sulfur | 4 |
| Diphenylguanidine | 4 |

After thoroughly incorporating the dye containing composition with the rubber mix, the material is vulcanized in a mold for 75 minutes at 40 pounds per square inch steam pressure (141° C.) producing a vulcanized product of light blue shade which is fast to light.

In the foregoing examples the oxidation of the leuco compound of the dye is effected in part at least prior to the coagulation of the latex. However, it will be apparent that oxidation may be effected subsequent to coagulation of the latex or even subsequent to vulcanization of the rubber mix, if so desired. Numerous other changes in the procedure may be made in carrying out the process, and as indicated above, the invention may be employed in treating materials other than latex, and a large number of dyes capable of being reduced by the action of organic reducing agents free from sulfur or sulfur compounds may be employed without departing from my invention.

I claim:

1. In the production of colored unvulcanized rubber which will not deteriorate upon standing the process step which comprises preparing a mixture of a leuco compound of a vat dye which has been prepared by the action of a reducing carbohydrate and unvulcanized rubber.

2. In the production of colored unvulcanized rubber which will not deteriorate upon standing the process step which comprises reducing a vat dye to produce the corresponding leuco compound by the action of a reducing carbohydrate and mixing said leuco compound with unvulcanized rubber.

3. In the production of colored unvulcanized rubber which will not deteriorate upon standing the process steps comprising reducing a vat dye to produce the corresponding leuco compound by the action of a reducing carbohydrate, and mixing the resulting leuco compound with rubber latex.

4. In the production of colored unvulcanized rubber which will not deteriorate upon standing the process steps comprising reducing a vat dye to produce the corresponding leuco compound by the action of a reducing sugar in the presence of a caustic alkali, and mixing the resulting leuco compound with rubber latex.

5. In the production of colored unvulcanized rubber which will not deteriorate upon standing the process steps comprising reducing a vat dye to produce the corresponding leuco compound by the action of a corn sugar in the presence of caustic soda, and mixing the resulting leuco compound with rubber latex.

6. The method of producing a composition comprising unvulcanized rubber which will not deteriorate upon standing and adapted for use in the production of colored rubber products comprising the process steps of reducing a vat dye to produce the corresponding leuco compound by the action of reducing carbohydrate, mixing the resulting leuco compound with rubber latex, coagulating the latex, and oxidizing the leuco compound to reproduce the dye.

7. The method of producing a composition comprising unvulcanized rubber which will not deteriorate upon standing adapted for use in the production of colored rubber products comprising the process steps of reducing a vat dye to produce the corresponding leuco compound by the action of a reducing sugar in the presence of an alkaline agent, mixing the resulting leuco compound with rubber latex, coagulating the latex, and oxidizing the leuco compound to reproduce the dye.

8. The method of making a composition comprising unvulcanized rubber which will not deteriorate upon standing and adapted for use in the production of colored rubber products which comprises mixing a vat dye with a reducing sugar and a caustic alkali solution, heating the mixture to reduce the dye to the corresponding leuco compound, mixing the resulting material with latex, treating the mixture of latex and leuco compound to partially oxidize the leuco compound, coagulating the latex with an organic acid, separating the colored and coagulated latex from the solution in which it is present, and washing and milling the resulting product in the presence of air.

9. The method of making colored unvulcanized rubber compositions which will not deteriorate upon standing and adapted for incorporation into a rubber mix which comprises mixing a vat dye with corn sugar and a solution of caustic soda, heating the mixture to convert the dye to the corresponding leuco compound, cooling the mixture and mixing the same with latex, treating the mixture of latex and leuco compound with a sufficient amount of an oxidizing agent to partially oxidize the leuco compound, coagulating the latex with an organic acid, separating the colored and coagulated latex from the solution in which it is present, washing and oxidizing the resulting composition.

10. The method of making a composition comprising unvulcanized rubber which will not deteriorate upon standing and adapted for use in the production of colored rubber products which comprises mixing two parts by weight of a paste containing 20 per cent of a vat dye with one part by weight of corn sugar in the presence of a solution of caustic soda, heating the mixture to reduce the dye to the corresponding leuco compound, adding one part by weight of 38 per cent latex to the mixture, treating the mixture of latex and leuco compound to partially oxidize the leuco compound, coagulating the latex with an acid, separating the coagulated latex from the solution in which it is present, and washing and oxidizing the resulting product in the presence of air.

11. A composition which will not deteriorate upon standing and adapted for use in producing colored rubber products comprising unvulcanized coagulated rubber latex and the leuco compound of a vat dye, said leuco compound being prepared by the action of a reducing carbohydrate on the vat dye.

12. A composition which will not deteriorate upon standing and adapted upon treatment with an oxidizing agent and a coagulating agent to be used in the production of colored rubber products, comprising latex and the leuco compound of a vat dye produced by the action of a reducing carbohydrate upon a vat dye.

13. A composition which will not deteriorate upon standing and adapted upon treatment with an oxidizing agent and a coagulating agent to be used in the production of colored rubber products, comprising latex and the leuco compound of a vat dye produced by the action of a reducing sugar in alkaline solution free from sulfur and sulfur compounds upon a vat dye.

14. A composition which will not deteriorate upon standing and adapted for use in producing colored rubber products comprising rubber latex and the leuco compound of a vat dye a portion only of which has been oxidized to the dye itself, said leuco compound being prepared by the action of a reducing carbohydrate upon the vat dye.

HARRY G. KIERNAN.